Oct. 18, 1960 L. H. WILLS 2,956,698
HYDRAULIC LOADING AND UNLOADING DEVICE
Filed Dec. 9, 1957 2 Sheets-Sheet 1

Lester H. Wills
INVENTOR.

BY Clarence A O'Brien
and Harvey B. Jacobson
Attorneys

Oct. 18, 1960 L. H. WILLS 2,956,698
HYDRAULIC LOADING AND UNLOADING DEVICE
Filed Dec. 9, 1957 2 Sheets-Sheet 2
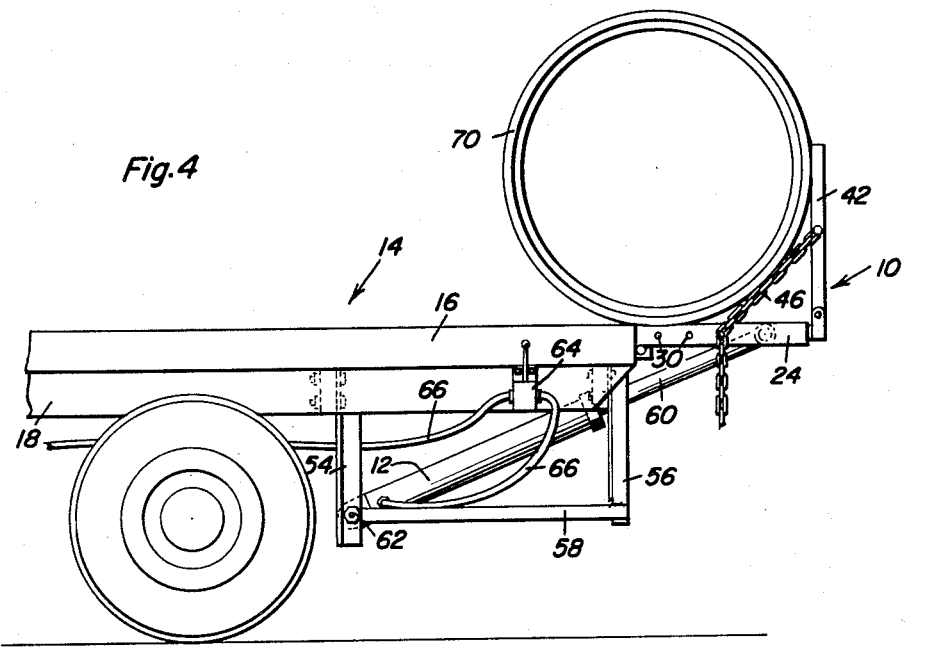
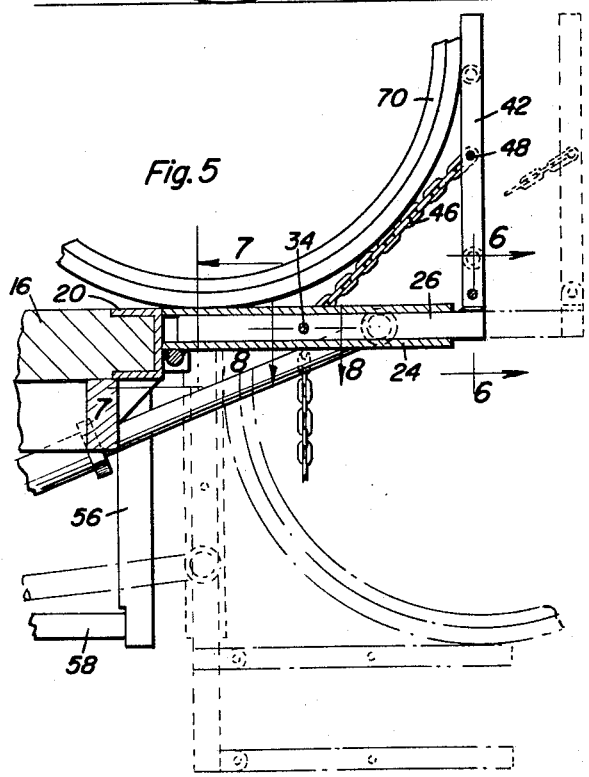
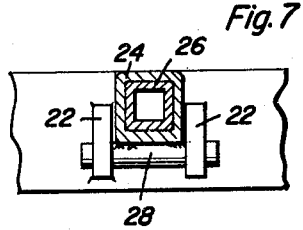
Lester H. Wills
INVENTOR.

2,956,698
Patented Oct. 18, 1960

2,956,698

HYDRAULIC LOADING AND UNLOADING DEVICE

Lester H. Wills, 930 6th St., Sibley, Iowa

Filed Dec. 9, 1957, Ser. No. 701,620

2 Claims. (Cl. 214—77)

This invention relates generally to devices for use in conjunction with trucks, and more particularly to a hydraulic loading and unloading device which is particularly suited for use with cement tile.

The primary object of this invention is to provide a hydraulic loading and unloading device adapted for attachment to the rear of a truck bed, which facilitates the handling of heavy cement tile when loading and unloading the same.

Another object of this invention is to provide a hydraulic loading and unloading device which may be folded up when not in use and may be used as the rear bumper of the vehicle to which it is connected.

A further object of this invention is to provide a device which may be used in handling very heavy cement tile, and do so in such a manner as to obviate the problem of the cement tile cracking or breaking when unloading tile from a truck.

Still a further object of this invention is to provide a hydraulic device having an adjustable cradle whereby when cement tile are to be unloaded from a truck the distance that the tile must travel from the cradle to the ground is at a minimum.

Yet a further object of the invention is to provide an hydraulic loading and unloading device which uses a cradle for the material handling, and this cradle comprises a first and second member which are at right angles to each other when in use. The sections of the cradle are resiliently mounted away from each other, and means are provided whereby the motion of the resilient means is limited, so that the cradle is always urged into the correct open position.

Another object of this invention is to provide a simple and inexpensive device and yet one which is exceedingly effective for the purpose for which it is designed.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 4 is a side elevational view illustrating the use of this device in loading and unloading cement tile.

Figure 5 is an enlarged vertical sectional view taken substantially along the plane defined by reference line 5—5 of Figure 2, and illustrating details of construction of the device;

Figure 6 is a vertical sectional view taken substantially along the plane defined by reference line 6—6 of Figure 5;

Figure 7 is a vertical sectional view taken substantially along the plane defined by reference line 7—7 of Figure 5.

Figure 1:
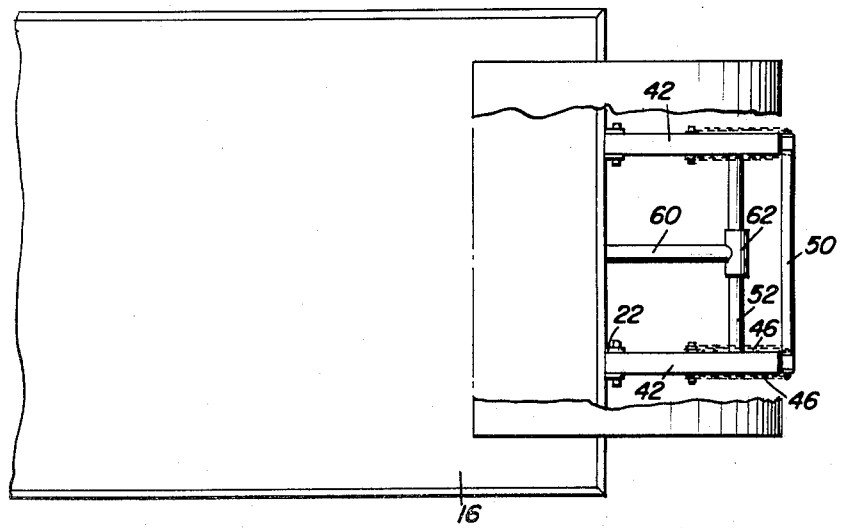
Figure 1 is an elevational plan view illustrating the present invention connected to the rear of a truck bed.
Figure 2:
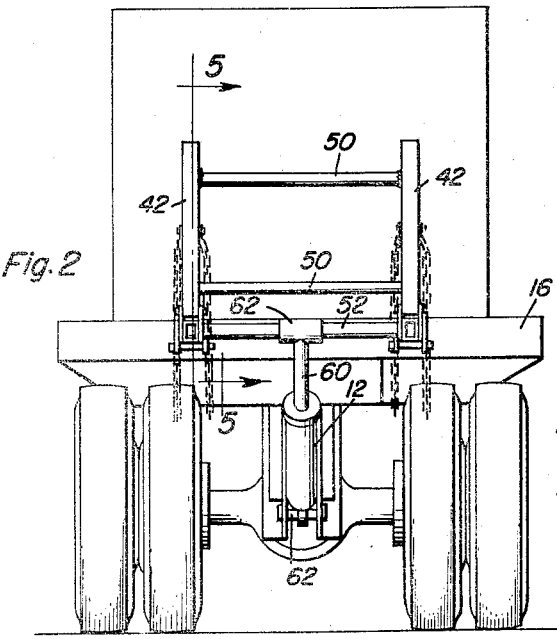
Figure 2 is a rear elevational view of the device illustrated in Figure 1.
Figure 3:
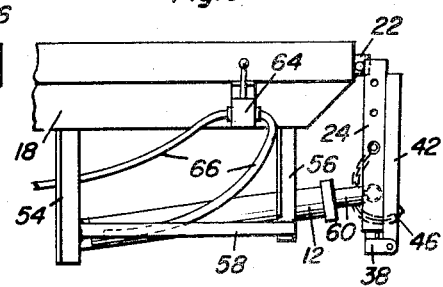
Figure 3 is a side elevational view of the device as it would appear when not in use.

Referring now more particularly to the drawings, the numeral 10 generally designates the material handling frame comprising the present invention which is moved by means of fluid motor 12, and both of these devices are mounted onto a truck 14.

The truck 14 is a vehicle of the conventional type, having a flat bed 16, and reinforcing sections 18. The reinforcing channel member 20 is connected to the rear edge of bed 16 and has a pair of flanges 22 extending rearwardly from either end thereof.

The material handling frame 10 is constructed of a main outer member 24, and a main inner member 26. Main member 26 is slidingly and telescopically accommodated within main member 24. A shaft 28 journaled in flanges 22 is welded to the lower forward surface of main outer member 24.

Figure 8:
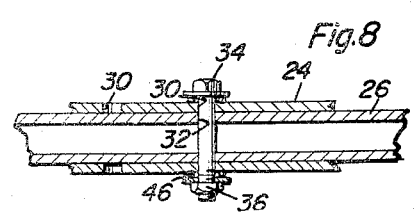
Figure 8 is a horizontal sectional view, considerably enlarged, taken substantially along the plane defined by reference line 8—8 of Figure 5.

Looking now more particularly at Figure 8, it may be seen that a plurality of horizontal openings 30 are formed to outer main member 24, and a single horizontal opening 32 is formed through inner main member 26. These openings are placed in alignment with each other and a bolt 34 passed therethrough and locked therein by means of nut 36. Thus, it may be seen that the length of the main member consisting of members 24 and 26 may be varied in length because of the telescopic mounting of these members.

At the outer end of inner telescopic main member 26 are a pair of upstanding flanges 38 into which a bolt 40 is mounted. A backing member 42 is pivotally connected to bolt 40, and is constantly being urged away from member 26 because of an axial spring 44. A chain 46 limits the movement of backing member 42 and is used to hold backing member 42 at right angles to inner main member 26, when the device is to be used. Chain 46 is connected to backing member 42 by means of the bolt 48 which is mounted therein, and another portion of the chain is passed about bolt 34 so that when the inner telescopic member 26 is moved, bolt 34 must move and a corresponding movement of the chain to change the effective length thereof is necessitated.

Reinforcing members 50 are connected between the two backing members 42, in spaced, horizontal, parallel relation to each other. Another reinforcing member 52 is connected horizontally between the two main outer members 24.

A fluid motor or fluid pressure actuating unit 12 is mounted on the frame constructed of forward and rearward vertically depending members 54 and 56, respectively, which are connected to reinforcing member 18. A horizontal member 58 serves to support the fluid motor frame by connecting the lower ends of depending vertical members 54 and 56. The fluid motor 12 having a piston rod 60 is pivotally connected at 62 to the juncture of frame members 54 and 58. At the outer end of piston rod 60 is connected a lateral sleeve 62 which engages reinforcing member 52.

Now, it may be realized that upon extension of piston rod 60 the main frame members 24 and 26 will be moved to a horizontal position by pivoting about shaft 28 until the forward end of outer main member 24 abuts against reinforcing channel member 20 of bed 16.

In use, a control box 64 would be mounted to reinforcing member 18, and to this control box would be connected hydraulic hosing 66 which is connected from a pump to fluid motor 12 to control the action of same. Of course, it may be realized that two or more pistons 12 may be used, depending upon the work which is required and the load to be handled.

Looking now at Figure 4, it may be seen that a cement tile 70 is in position to be lowered to the ground. Upon actuation of control box 64, the frame 10 may be lowered into the dotted line position illustrated in Figure 5, whereby the cement tile 70 will be close to the ground and will roll gently thereupon. Since the length of the main members 24 and 26 is adjustable, the amount of drop of the cement tile 70 to the ground may also be controlled. When the frame 10 is not being used, the backing member 42 may be pivoted against outer main member 24 against action of axial spring 44, and chain 46 may be used to lock the members together. In this position, of course, the frame acts as a rear bumper for the vehicle.

It may now be seen that I have herein shown and described a new and improved type of hydraulic loading and unloading device suitable for trucks.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A loading and unloading device for trucks, in connection with the bed of a truck, comprising a material engaging frame, said frame comprising a horizontally transversely extending rearwardly projecting first section having its forward edge pivotally mounted upon the rear of said bed, the opposite edge of said horizontal section having pivoted thereto an upwardly extending second section, means resiliently urging said second section away from said first section, means connected to said sections limiting movement of said second section away from said first section, and means connected to the undersurface of said horizontal section intermediate its ends for selectively rotating said horizontal section about a horizontal axis between a horizontal and a vertical position, said rotating means comprising at least one fluid pressure actuating unit secured beneath said bed, a moving part of said unit connected to said first section, means for varying the length of said first section, said connecting limiting means comprising chains secured between corresponding sides of said sections intermediate the ends thereof, said first section including a pair of hollow members substantially rectangular in cross-section having a pair of smaller extension members slidably disposed therein, a plurality of longitudinally spaced apertures formed through said side members, an aperture formed in each of said extension members selectively registerable with one of the apertures in the corresponding side member, a pair of fasteners secured through said registered apertures, said second section being pivotally secured to rearmost portions of said extension members.

2. The combination of claim 1 including a pair of upstanding lugs secured to the rear end of each of said extension members, aligned apertures formed in said lugs, aligned apertures formed in the adjacent ends of said second section, a pivot bolt secured through the aligned apertures in said lugs and said second section, the apertures in said lugs being spaced from said extension member a sufficient amount whereby said second section may be pivoted to a position flat against said first section.

References Cited in the file of this patent

UNITED STATES PATENTS

| | | |
|---|---|---|
| 1,758,431 | Crannel | May 13, 1930 |
| 1,945,426 | Evoy | Jan. 30, 1934 |
| 2,390,268 | Penney | Dec. 4, 1945 |
| 2,553,156 | Woodward | May 15, 1951 |
| 2,753,058 | Potthoff et al. | July 3, 1956 |
| 2,781,924 | Hughes | Feb. 19, 1957 |